United States Patent
Dames et al.

(10) Patent No.: US 7,418,167 B2
(45) Date of Patent: Aug. 26, 2008

(54) OPTICAL SWITCHING USING OPTICAL FIBER CONNECTOR

(75) Inventors: Andrew Nicholas Dames, Cambridge (GB); Michael Francis Grant, Herts (GB)

(73) Assignee: Polatis Ltd., Cambridge (GB)

( * ) Notice: Subject to any disclaimer, the term of this patent is extended or adjusted under 35 U.S.C. 154(b) by 0 days.

(21) Appl. No.: 10/554,794

(22) PCT Filed: Apr. 30, 2004

(86) PCT No.: PCT/GB2004/001916

§ 371 (c)(1),
(2), (4) Date: Jan. 17, 2007

(87) PCT Pub. No.: WO2004/097485

PCT Pub. Date: Nov. 11, 2004

(65) Prior Publication Data

US 2007/0154138 A1    Jul. 5, 2007

(30) Foreign Application Priority Data

Apr. 30, 2003    (GB) ................... 0309898.5

(51) Int. Cl.
G02B 6/26     (2006.01)
G02B 6/42     (2006.01)
(52) U.S. Cl. ................. 385/16; 385/18; 385/19; 385/53
(58) Field of Classification Search .......... None
See application file for complete search history.

(56) References Cited

U.S. PATENT DOCUMENTS

| | | | | |
|---|---|---|---|---|
| 5,004,318 A * | 4/1991 | Ohashi | ............. | 385/19 |
| 5,179,602 A | 1/1993 | Norcross, Jr. | | |
| 5,633,968 A * | 5/1997 | Sheem | ............. | 385/53 |
| 5,708,745 A | 1/1998 | Yamaji et al. | | |
| 6,144,782 A * | 11/2000 | Takahashi | ............. | 385/20 |
| 6,393,174 B1 | 5/2002 | Karaguleff et al. | | |
| 6,430,332 B1 | 8/2002 | Laor et al. | | |
| 6,463,189 B1 | 10/2002 | Wu et al. | | |
| 2003/0002808 A1 | 1/2003 | Lampert et al. | | |
| 2004/0022484 A1* | 2/2004 | Sigloch et al. | ............. | 385/22 |
| 2006/0072878 A1* | 4/2006 | Dames et al. | ............. | 385/47 |

FOREIGN PATENT DOCUMENTS

| | | |
|---|---|---|
| DE | 36 33 755 A1 | 4/1988 |
| DE | 196 18 203 A1 | 11/1997 |
| GB | 2 387 447 A | 10/2003 |
| JP | 57085014 A | 5/1982 |
| JP | 57192902 A | 11/1982 |
| JP | 2-272405 | 11/1990 |
| JP | 4-366804 | 12/1992 |

* cited by examiner

Primary Examiner—Tina M Wong
(74) Attorney, Agent, or Firm—Workman Nydegger

(57) ABSTRACT

An optical switching device, comprises an optical switch and an optical connector receiving means mateable with a connector., means for effectuating switching by engaging a connector in said receiving means, characterised in that said switching effectuating means acts or is acted upon once a connector is sufficiently engaged in the receiving means for optical communication with the connector to occur.

10 Claims, 8 Drawing Sheets

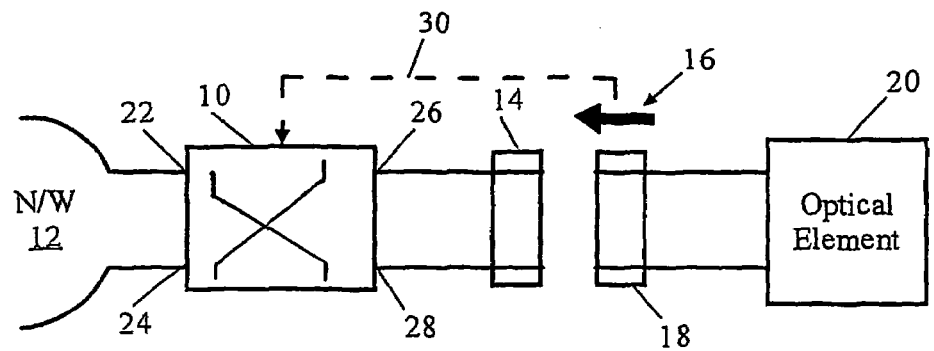
Fig 1
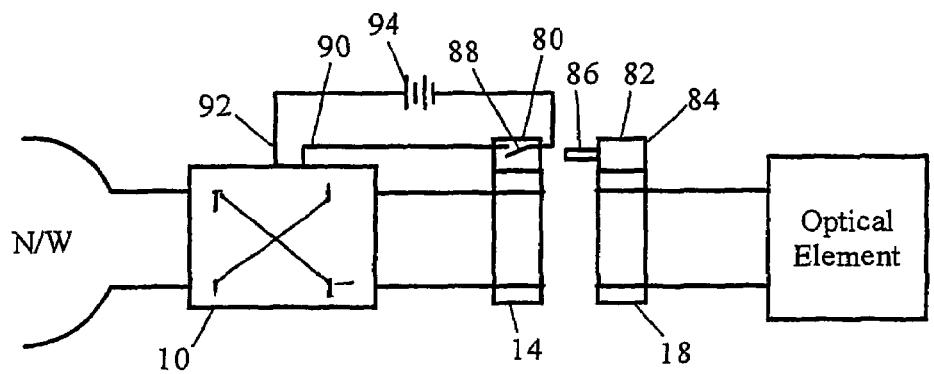
Fig 3
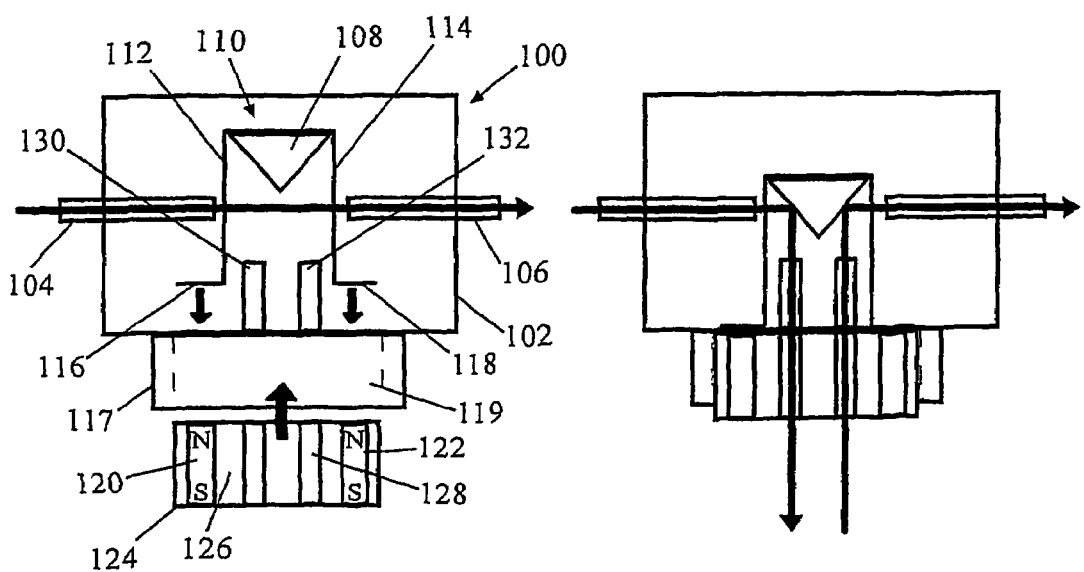
Fig 4(a)   Fig 4(b)

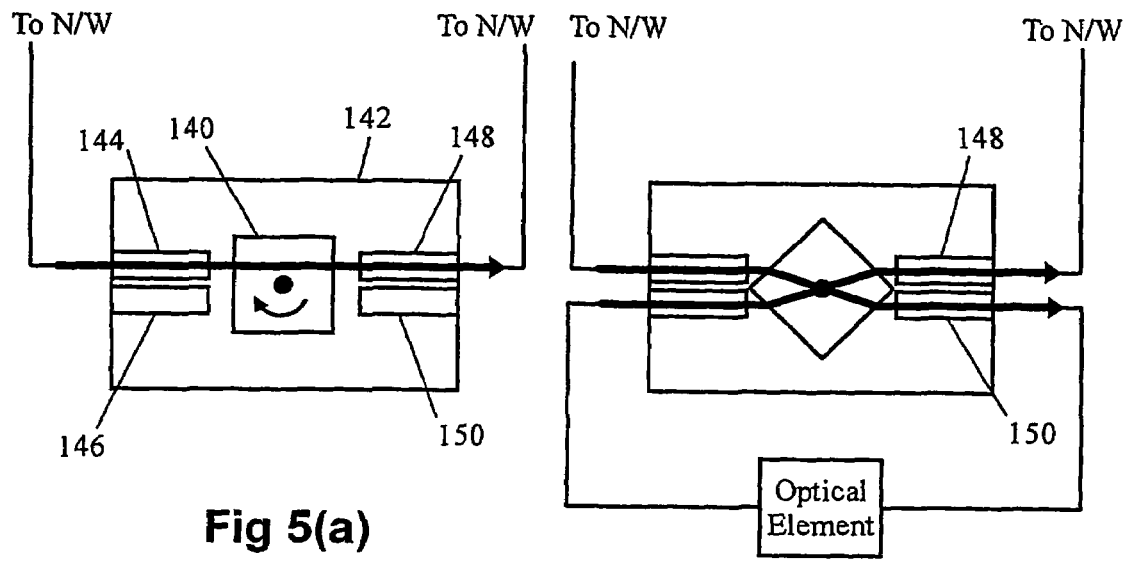
Fig 5(a)
Fig 5(b)
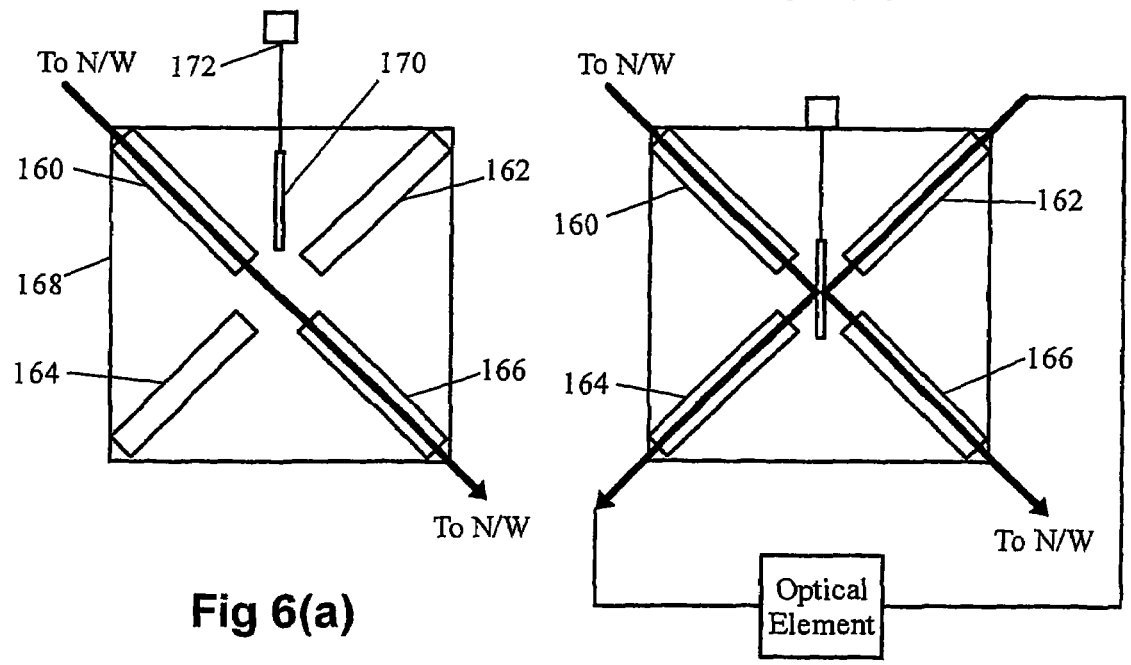
Fig 6(a)
Fig 6(b)

OPTICAL SWITCHING USING OPTICAL FIBER CONNECTOR

FIELD OF THE INVENTION

The invention relates to an optical switching device and a device for extending the functionality of an optical network comprising such an optical switching device.

BACKGROUND OF THE INVENTION AND CLOSEST PRIOR ART HNOWN TO THE APPLICANT

One of the major problems in designing optical networks is in the placement of the optical components, such as Optical Add Drop Multiplexers (OADMs), optical switches, amplifiers, equalisers and dispersion-compensating elements. Design decisions on the inclusion and placement of such elements need to accommodate not only the initial traffic on the network, but also future network growth, which is often unpredictable. This issue is especially critical for Metropolitan (or city) networks where cost needs to be minimised and growth is especially unpredictable.

The closest prior art to the invention is acknowledged:
JP040366804A; (Hitachi);
US6463189B1 (Avanex);
US6430332 (Fibre);
JP020272405A (Fujitsu);
US5179602 (Norcross).

SUMMARY OF THE INVENTION

In accordance with a first broad independent aspect of the invention, there is provided an optical switching device comprising an optical switch and an optical connector receiving means mateable with a connector, means for effectuating switching by mating a connector with said receiving means, characterised in that said switching effectuating means acts or is acted upon once a connector is sufficiently mated with the receiving means for optical communication with the connector to occur.

One application of such an optical switching device is in the field of optical networks, where it may be desired to retrofit an optical element into the network. In this case the present invention provides for a device for extending the functionality of an optical network by the addition of an optical element, the device comprising an optical switching device as just recited, the connector being connected to said optical element.

The advantage of using such a hybrid switch-connector structure is that standard equipment installation practices developed for use with optical connectors and passive devices can be used. Installation personnel simply clean the connector ends and plug the optical element into the network. There is no procedural discontinuity between the actions of plugging the optical element into the network and activating the switch to reroute the traffic through the optical element.

The hybrid switch-connector structure in question is also particularly advantageous because it is not dependent upon the velocity with which a user must insert the connector to the receiving means. Once the connector is in an appropriate position switching occurs immediately without abnormal effort to the user. This marks a radical departure from the teaching of prior art documents such as Fujitsu (referenced above), where the input or output ports of the switch are displaced in a manner directly dependent on the velocity of insertion of the connector and during the insertion of a connector rather than once secured into position.

With careful design, it is possible to have the optical switching action take place in <10 ms, which is short enough for the element to be introduced without significantly impacting the optical traffic in the network.

In a subsidiary aspect in accordance with the invention's broadest aspect, the connector receiving means is configured so that when a connector is mated with the connector receiving means, it allows a connector to be locked in its operative position by a snap action and means are provided to allow the connector receiving means to cause switching as a result of the snap action. This configuration is particularly advantageous because it may employ a standard connector to actuate the switching effectuating means in a rapid and secure manner.

In a further subsidiary aspect, the device is adapted so that the switching is caused by a connector lever.

In a further subsidiary aspect, the connector receiving means is a duplex receiving means with a single lever receiving portion which allows a duplex connector lever to cause switching. This configuration allows enhanced accuracy to be achieved for a duplex application. It also reduces the number of components required to receive a single lever duplex connector.

In a further subsidiary aspect, the means for effectuating switching incorporate a reflecting or refracting element mounted on a flexure plate which is configured to return said elements when the connector is removed from the receiving means. This structure is particularly advantageous because it achieves high levels of repeatability with rapid switching without modifying an operator's connection motion.

In a further subsidiary aspect, the means for effectuating switching operate by the completion of an electrical circuit when the connector is pushed fully home.

Actuation of the switch may be by electrical, purely mechanical or purely magnetic means. An advantage of electrical or purely magnetic actuation is that it simplifies the hermetic sealing of the switch, thereby protecting it against the undesirable ingress of foreign matter. A second advantage of the electrical actuation is that it allows numerous existing electrically activated switch structures to be used in this hybrid switch-connector structure. An advantage of purely mechanical or purely magnetic actuation is that it requires no external source of power to actuate the switch.

In a second broad independent aspect, the invention provides an optical switching device, comprising an optical switch and an optical connector receiving means mateable with a connector, characterised in that the switching is triggered by an external source which when applied causes a locking mechanism to lock the connector in the receiving means.

In a subsidiary aspect in accordance with invention's second broad aspect, means are provided to ensure that light is transmitted to the connector only when a connector is in position in the receiving means.

BRIEF DESCRIPTION OF THE DRAWINGS

FIG. 1 is a schematic diagram illustrating the principle of the invention;

FIG. 3 is a diagram of a second embodiment of an optical switching device in accordance with the invention;

FIGS. 4(a) and 4(b) are diagrams showing the operation of an optical switching device according to the invention in a third embodiment thereof;

FIGS. 5(a) and 5(b) illustrate the operation of an optical switching device in which a variant type of 2×2 switch is employed, and FIGS. 6(a) and 6(b) illustrate the operation of an optical switching device employing a further variant type of 2×2 switch;

DETAILED DESCRIPTION OF EMBODIMENTS OF THE INVENTION

Figure 2A:
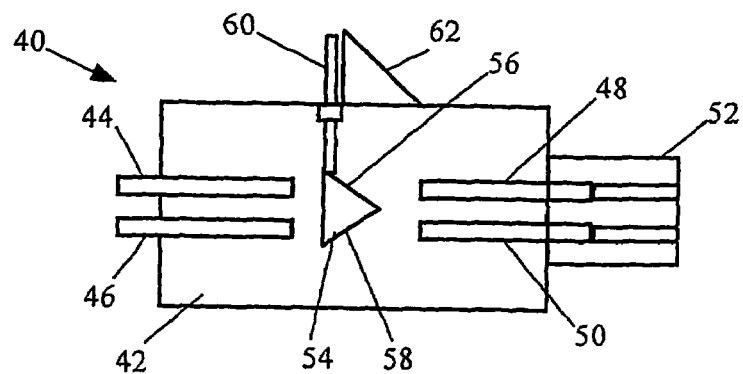
FIGS. 2(a), 2(b) and 2(c) are diagrams showing the operation of an optical switching device in accordance with a first embodiment of the invention.

The principle of the invention is illustrated in FIG. 1. In FIG. 1 an optical switching device comprises an optical switch in the form of a 2×2 switch 10, which is connected on one side to an existing network 12 and on the other side to one half 14 of an optical connector 16. In this embodiment, half 14 acts as a receiving means. The other half 18 of the optical connector 16 (which may be also referred to as a connector) is connected to an optical element 20, which may be, purely by way of example, an amplifier, an add-drop multiplexer, and so on.

In a first mode of operation of the device, the switch 10 with the first connector-half is in-situ inserted in the existing network 12 and is configured so that the optical signal on port 22 is routed directly through to port 24. Ports 26 and 28 of the switch are dormant at this stage and are simply connected to the half 14 of the connector 16 ready for when it is desired to extend the functionality of the network 12.

When the time comes to extend the network by the addition of the optical element 20, the second half 18 of the connector 16 is mated up with the first half 14 and the action of mating these two halves together actuates the switch 10 (see broken line 30) so that the optical signal on port 22 is routed through to port 26, out to the optical element 20 via the connector halves 14 and 18, back through the connector halves 18 and 14 and then out through port 24 of the switch to the network. Thus the optical element 20 has been "retrofitted" into the network.

The actuation of the switch by the connector-mating action may take any of a number of forms. One such form, which is purely mechanical, is shown in FIG. 2(a). In FIG. 2(a) a 2×2 switch 40 comprises a switch body 42, which houses at one end a pair of fiber guides 44, 46. The guides may also operate in conjunction with respective collimators. At the other end of the body 42 there is a corresponding pair of fiber guides/collimators 48, 50. Also attached to the other end of the body 42 is a ferrule 52, which functions as one half of an optical connector. Also present in the body is a prism 54, which has two total internal reflection surfaces 56, 58, and a lever 60 attached to the prism. The prism is held in the body in a manner such that it can slide, by means of pressure applied to the lever, downwards so as not to obstruct optical radiation in the guides. The body 42 has a detent 62 for a reason to be explained in connection with FIGS. 2(b) and 2(c).

In the first mode of operation of the switch, the optical signal entering the optical guide 44 is reflected off of the surfaces 56 and 58 and back out through the optical guide 46. In a second mode of operation, when it is desired to upgrade the network by the addition of an optical element, a second connector half 70 (see FIG. 2(b)) is fitted over the ferrule 52 so that a mating surface 55 of the second connector half directly abuts the end of the ferrule 52. In this position two further optical guides/collimators 72, 74 can carry light which will eventually exit from or enter the guides 48, 50. The guides 72, 74 are taken to the optical element 76 via optical fibers.

Figure 2B:
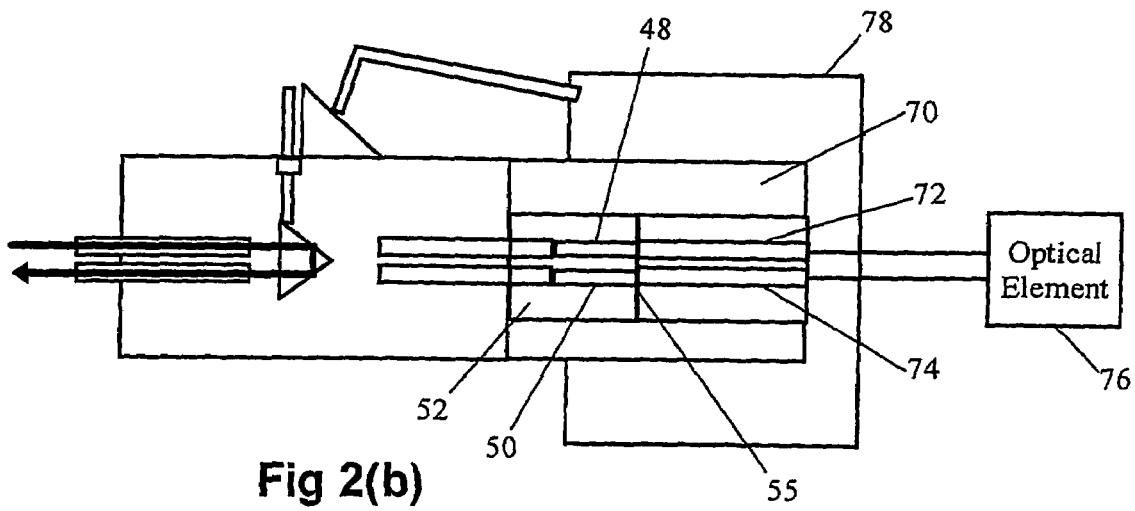
Figure 2C:
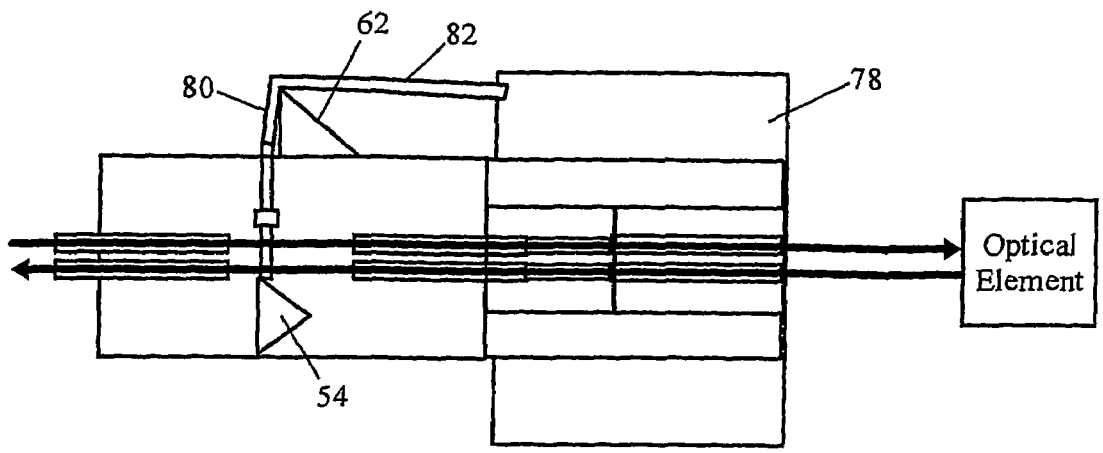

Once the two connector halves (or in other words the receiving means and a connector) are offered up to each other as shown in FIG. 2(b), a bulkhead 78 is pushed forward so that the hooked end 80 of a spring-loaded arm 82, which is pivotally attached to the bulkhead 78, rides over the detent 62 and falls back down behind the detent (see FIG. 2(c)). In the process the hooked end 80 depresses the lever 60, thereby pushing the prism 54 down, allowing the optical signals to pass between the guides at the two ends of the body 42. (The prism is also spring-loaded at its lower end in order to allow it to regain its original position once the bulkhead 78 is retracted.) Thus, as explained in connection with FIG. 1, the optical element is now part of the network attached to the guides 44, 46.

A second embodiment of the invention employs an electrical form of actuation of the 2×2 switch. This is shown in FIG. 3, in which the two connector halves 14, 18 (or in other words a receiving means and a connector) are associated with additional electrical switch members 80, 82, respectively. In the realisation shown in FIG. 3, the switch member 82 consists simply of a fixture 84 having at its end which is to face its opposite number 80 a small peg 86. The peg 86 fits inside switch member 80, which is attached to the connector-half 14, and operates a single-pole switch 88, thereby completing a circuit consisting of wires 90, 92, a battery or other source of power 94 and an actuation means inside the 2×2 switch 10. This actuation means may take the form of an electromagnetic actuating device such as a very small solenoid, which displaces an optical element such as the prism shown in FIGS. 2(a), (b) and (c).

In practice provision must be made for allowing the guide-ends in the connector halves to come together before switch actuation takes place. This will require an arrangement in which the peg 86 only operates the switch 88 after the connector halves have fully mated. This may be achieved by arranging for the switch member 82, for example, to be moveable in an axial direction relative to connector half 18, while at the same time being attached thereto. Alternatively, an electrical delay could be included in the electrical circuit formed by items 94 and 88 shown in FIG. 3.

The 2×2 switch may be actuated not only mechanically or electrically, but also by purely magnetic means. An example of this is shown in FIG. 4. In FIG. 4(a) a 2×2 switch 100 comprises a body 102 containing optical guides/collimators 104, 106 at opposite ends, between which is disposed offset from the common axis of the guides a prism 108, having two reflective sides. Secured to the prism is a small iron frame 110 having two legs. 112, 114 perpendicular to the guide axis and respective end-portions 116, 118 parallel to the guide axis. The legs are provided with cut-outs allowing light to pass through unhindered. Orientated perpendicularly to the guides 104, 106 are further guides 130, 132. A first connector-half 117 (or in other words a receiving means) is attached by some suitable means to the body 102.

Attached to radially opposite ends of the second connector-half 124 (or in other words a connector) are two small permanent magnets 120, 122 orientated magnetically as shown (the polarities of both magnets may be of sign opposite to that shown in the figure). The magnets are advantageously sunk into the connector half itself, e.g. located inside respective bores made in the connector half, or they may be external to the connector half. In this embodiment it is necessary to orientate and position the second connector half accurately with respect to the switch itself, both from the point of view of enabling a reliable magnet actuation action and, even more importantly, from the point of view of ensuring good light transfer from the switch to the guides of the second connector half. To this end the first connector-half 117 is accurately positioned with respect to the switch body 102 and it has a bore 119, which is designed to be a snug fit around the second connector-half 124. To ensure good alignment between the guides 130, 132 and the guides 126, 128, the two connector-halves 117, 124 are keyed to each other, e.g. by the provision of an axial groove in the first connector-half 117 and a corresponding axial ridge in the second connector-half 124. There may also be a releasable latching means (not shown) for selectively latching and unlatching the second connector-half to/from the first once they are mated together.

In operation, when the second connector half 124 is introduced into the first connector-half 117, the frame is attracted towards the magnets and the prism is displaced downwards, the end-portions 116, 118 of the frame coming to rest against the bottom of the body 102 (see FIG. 4(b)). (It should be noted that the prism will be restrained as regards any lateral movement so that it maintains the same axial position as far as the guides 104, 106 are concerned). In this position the prism acts to totally reflect any signals entering/leaving the various guides—see arrows in FIG. 4(b). In this version of the invention the network connections are to the guides 104, 106, while the optical element to be retrofitted to the network is connected to the guides 126, 128 in the second connector half 124.

Instead of the whole frame 110 being composed of a magnetic material, only the end-portions 116, 118 may be magnetic, the rest being made of, e.g., a synthetic material. Furthermore, it is possible arrange for the frame 110 in FIGS. 4(a) and 4(b) to be, for example, rectangular in shape, whereby the legs 116, 118 are replaced by one horizontal member forming one side of a rectangle, or are still in the form of two legs, but facing inwards instead of outwards, and to employ either two magnets, as shown in the figures, or one magnet only, perhaps disposed centrally in the second connector half.

An advantage of magnetic actuation is that it allows the switch to be hermetically sealed, since no direct connection is made with any internal component of the switch.

An alternative realisation of the 2×2 switch function is shown in FIG. 5. Here a rectangular (preferably square) prism 140 is held inside a switch body 142 such as to be pivotable about its centre on an axis perpendicular to the axes of the optical guides 144, 146, 148 and 150. In the first mode of operation, when the switch is part of an existing network allowing optical signals to pass between various parts of the network signals pass from guide 144 through the prism 140 and out of guide 148. No refraction of the optical signals takes place, since the relevant faces of the prism 140 are exactly orthogonal to the direction of travel of the optical signals in the guides 144 and 148. The guides 146 and 150 carry no signals at this time. In the second mode of operation, some form of actuation (e.g. mechanical, electrical or magnetic, as described in connection with the earlier embodiments) causes the prism to rotate through 45° to assume the position shown in FIG. 5(b), whereby refraction now takes place and the signals from the network are forced to leave by way of the guide 150 and to re-enter, after passing through the optical element to which the second connector half (not shown) is connected, the switch through guide 146, where it passes through the prism once more and leaves via guide 148.

Another form of switch is shown in FIG. 6(a). In FIG. 6(a) four optical guides 160, 162, 164 and 166 are accommodated in an "X" formation inside the switch body 168, but without touching at the centre. Situated between guides 160 and 164 on the one hand and guides 162 and 166 on the other is a reflecting element 170, which has a reflecting surface on both sides. The reflecting element 170 is attached to an actuating arm 172, which is actuated by any of the methods heretofore described.

In operation, in the first mode described earlier the reflecting element 170 is lifted above the line of intersection of the signals in the guides, so that network signals pass through guide 160 and out again through guide 166. In the second mode of operation, on the other hand, when the optical connector halves coupled to the guides 162 and 164 are to be brought together so as to couple the optical element into the network, the arm 172 is displaced, causing a downward movement of the reflecting element 170, whereupon the signal from the guide 160 is reflected out of the switch via guide 164 and the return signal in the guide 162 is reflected out of the switch via guide 166 back to the network.

Although the optical switching device according to the invention has so far been described as having particular application to the retrofitting of optical networks with an optical network, it may also be used in other applications. One such is an optical sensor distribution system, where, for example, an optical temperature sensor could be plugged into a fiber ring as required. Another application could be an optical power distribution system, where optical power could be extracted from a ring by attaching to a connector-switch already inserted in the ring. A third alternative would be to use the connector-switch of the invention to allow a transceiver device to be clipped onto a secure communications ring in, for example, a military network.

Figure 7:
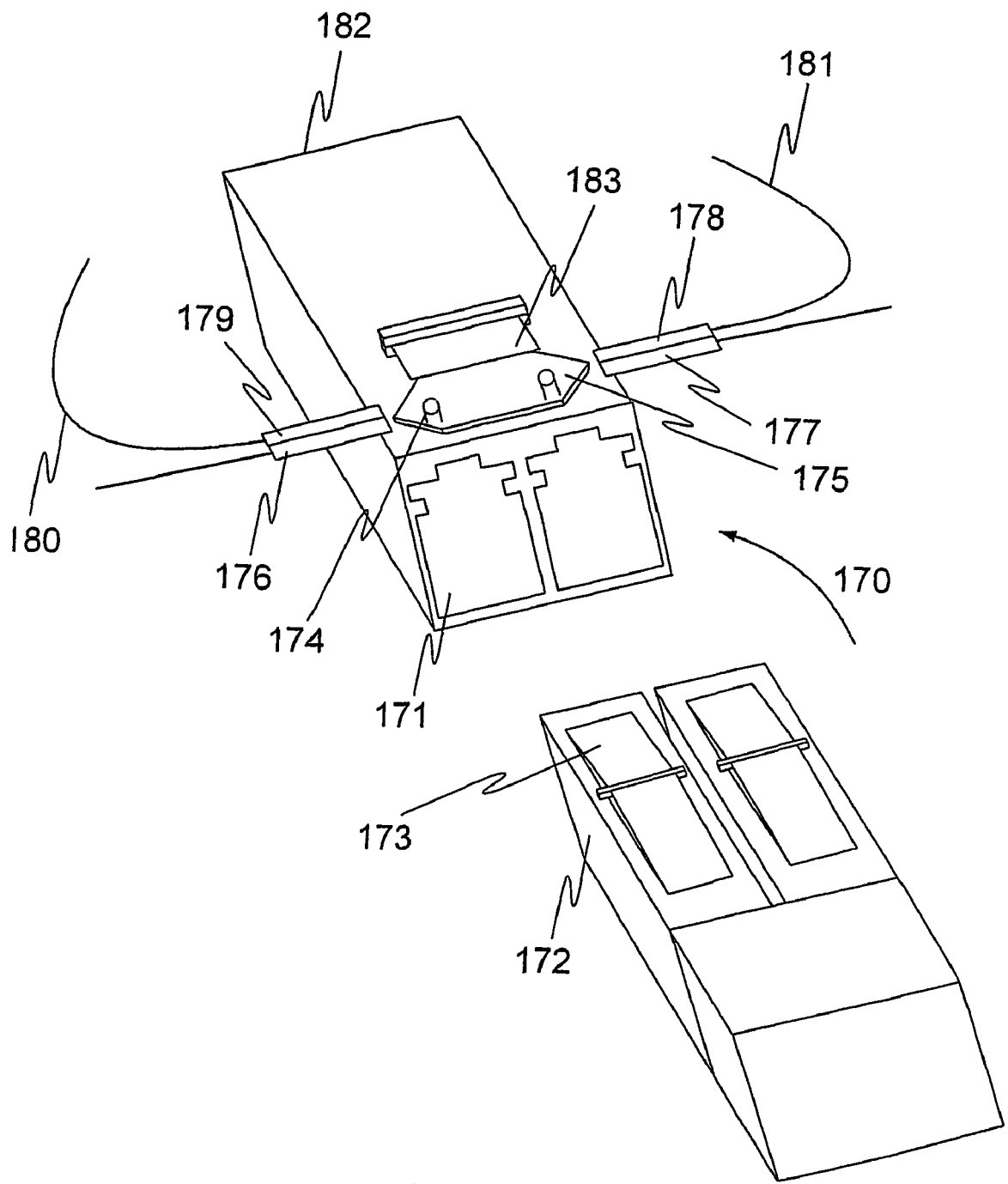
FIG. 7 illustrates a schematic perspective view of a further variant of the invention.

FIG. 7 shows an optical switch-connector device 170 with receiving means such as that referenced 171 as part of an adapter casing 182, the receiving means being configured to receive corresponding connector 172. Connector 172 may be selected by the person skilled in the art from known alternatives. The receiving means may be shaped to engage a portion of lever 173 and internal channels of receiving means 171 may be arranged to guide lever 173 to a locked position as connector 172 is inserted by an operator. As the connector is placed in an engagement which is sufficient to allow optical communication between the connector and the connector switch, the internal channels of the receiving means will allow the compressed lever to suddenly flex into a locked position—the snap action. As the lever rises in its locked position, the lever may act against a transmitting arm 174 which lifts a refractive device 175 from outside the line of the optical transmission to within the line of the optical transmission between an input port 176 and an output port 177. This will cause light to refract from port 176 to port 178 and from port 177 to port 179. Lines 180 and 181 may be configured and end with appropriate connectors (not illustrated in the figure) plugged into the end of adapter casing 182.

As connector 172 is removed from its receiving means 171 a flexure plate 183 lowers the refractive element 175 out of the optical path of port 76 and 77 so that conventional traffic may resume.

The input ports 176 etc may include collimators of approximately 1 mm diameter and 7 mm length. The refractive element may have a thickness of approximately 1 mm and a width of 2 mm. Other dimensions may of course be selected by the person skilled in the art as appropriate for particular applications.

Figure 8:
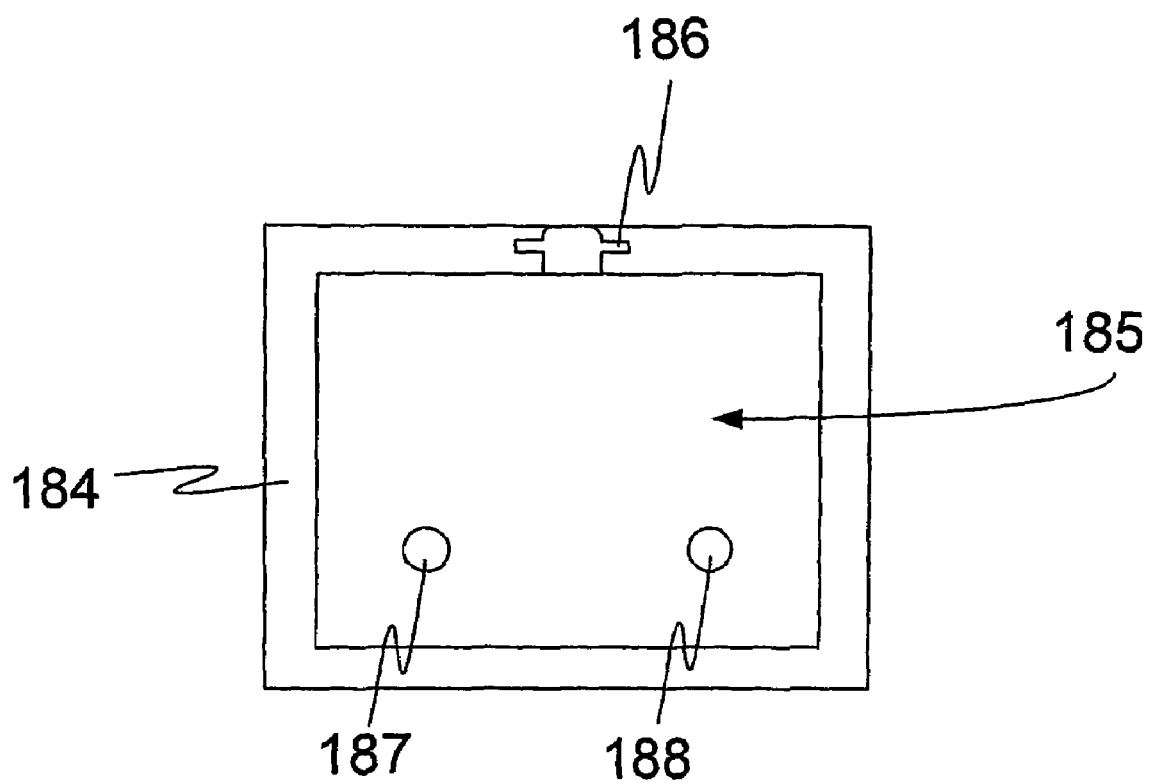
FIG. 8 shows an end view of a receiving means in accordance with a further embodiment of the invention.

FIG. 8 shows an adapter 184 with receiving means 185 of a kind which may accommodate a duplex patch cable with a single lever for activating the refractive element. Internal channels such as that referenced 186 may be provided in a similar manner as those discussed above with reference to FIG. 7 to guide and lock a lever of the appropriate connector. Two optical mating tunnels 187 and 188 are provided for engaging the optical ends of respective connectors.

Figure 9:
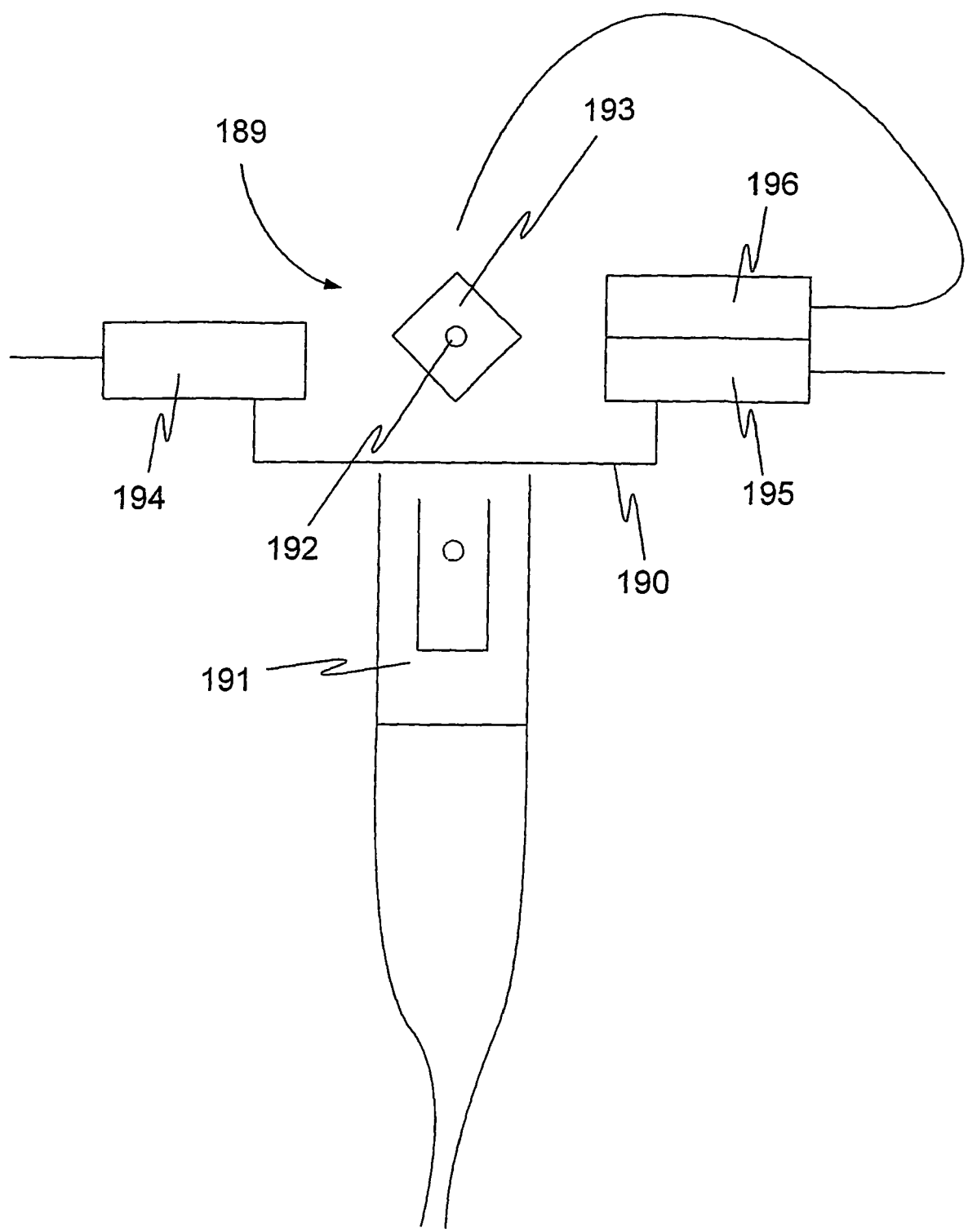
FIG. 9 shows a schematic plan view of a further embodiment of the invention.

FIG. 9 schematically illustrates a 2 X1 optical switch generally referenced 189 located on top of an adaptor casing 190 destined to operate with a single connector 191. As the single connector is secured in its corresponding receiving means, the snap action associated with the locking of the connector in position may lift an arm 192 and its corresponding refractive element 193 in the optical path of light travelling between collimators 194 and 195. The effect of the refractive element in its lifted position will be to refract light from collimator 194 to collimator 196 and on to connector 191 via the adapter casing 190.

All the embodiments of FIGS. 7 through 9 may be modified by the person skilled in the art so that when an operator engages the connector, switching effectuating means such as arm 192, may be actuated upon. The switching effectuating means may include magnetic, electronic and any other appropriate form of triggering mechanism which occurs when the connector is in an appropriate optical connection position. The systems may achieve switching speeds of the order of 10 ms, so that any interruption to the flow of traffic is minimised and almost done away with entirely.

Figure 10:
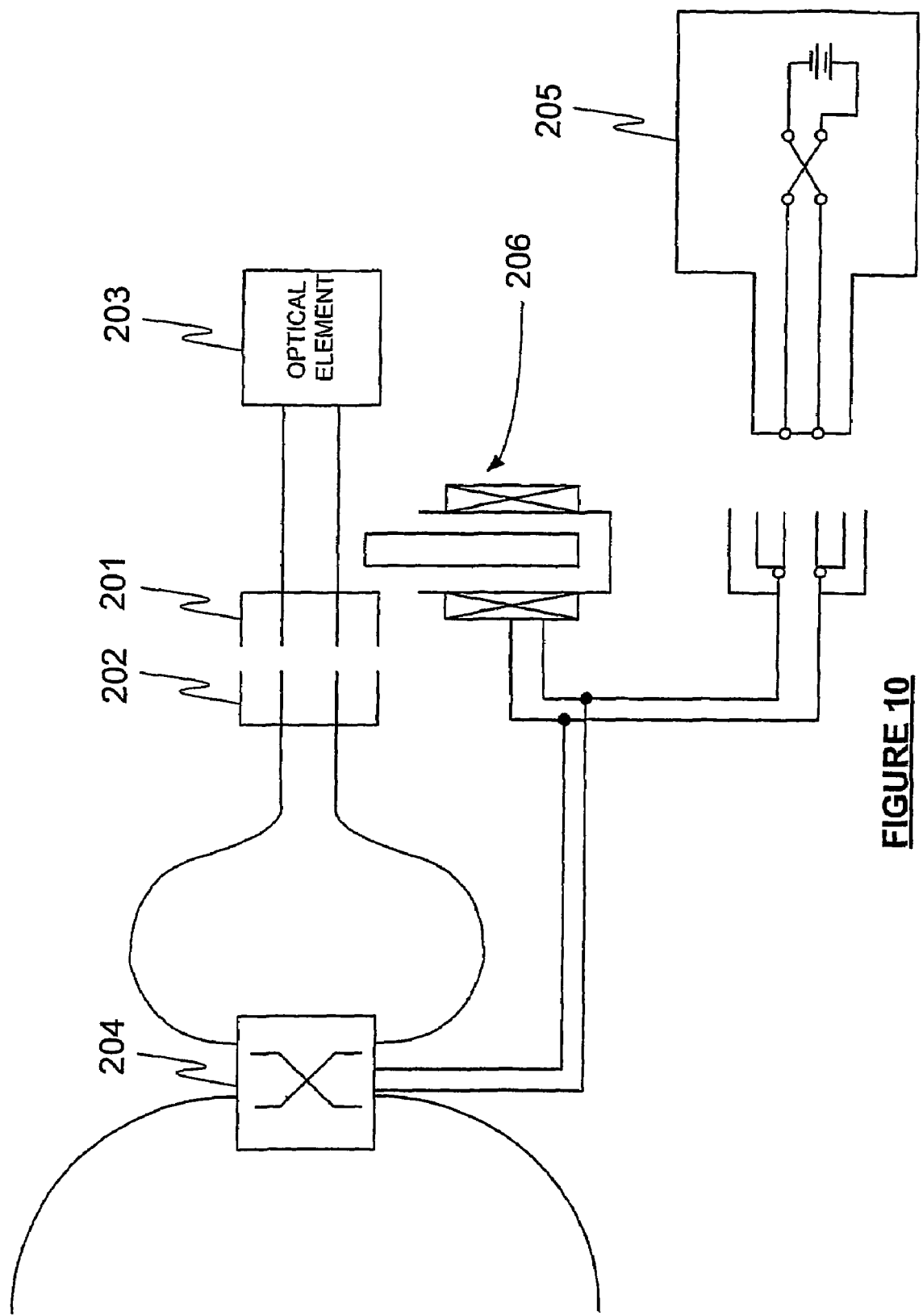
FIG. 10 shows a schematic plan view of a further embodiment of the invention.

FIG. 10 shows a connector 201 which may be of standard construction and a receiving means 202. Once the connector is mated to the receiving means optical element 203 may be added to the network. Switch 204 may be a switch of a standard kind whose switching is triggered by an external source—key 205. Once the connector is secured into the receiving means, pin and solenoid assembly 206 is actuated when the key actuates the switch. If a standard connector with lever is employed the pin may be selected to be able to lodge behind the lever to lock the connector in place.

Figure 11:
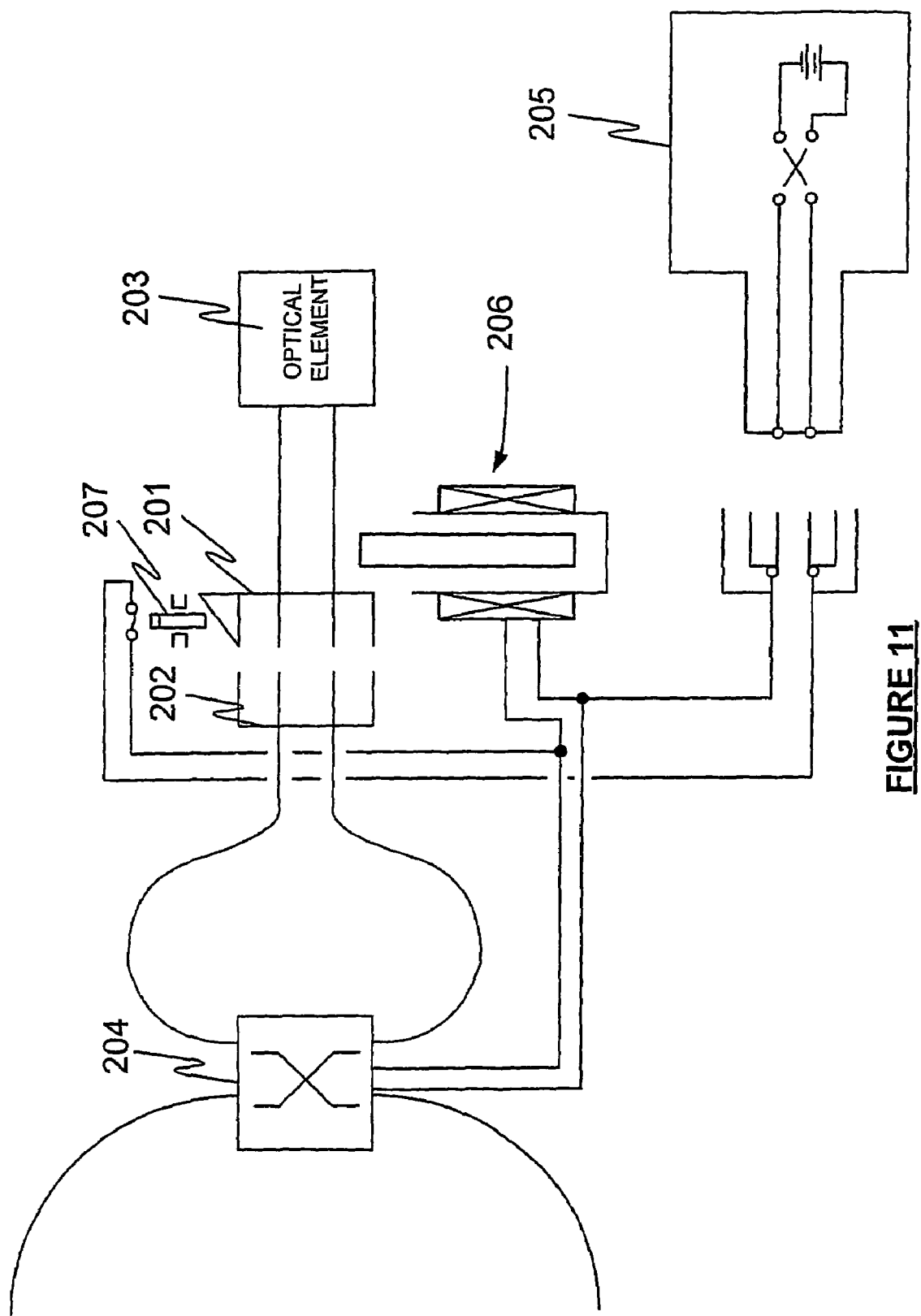
FIG. 11 shows a schematic plan view of a further embodiment of the invention.

FIG. 11 (identical numerical references have been used for similar components as those of FIG. 10) shows the use of a micro-switch 207 which is located in series in the circuit.

The invention claimed is:

1. An optical switching device, comprising
   an optical switch with a first port and a second port which are in communication with each other in a first mode of use, said optical switch further comprising a third port; wherein said device further comprises:
   an optical connector receiving means incorporating a port corresponding to said third port and mateable a connector's port; and
   means for effectuating switching between the first and third ports of said optical switch by engaging a connector with said receiving means in a second mode of use; wherein said switching effectuating means acts or is acted upon once a connector is sufficiently engaged with the receiving means for optical communication with the connector to occur.

2. Device according to claim 1, wherein the connector receiving means is so configured so that when a connector is mated with the connector receiving means, it allows a connector to be locked in its operative position by a snap action and means are provided to allow the connector receiving means to cause switching as a result of the snap action.

3. Device according to claim 2, wherein the device is adapted so that the switching is caused by a connector lever.

4. Device according to claim 1, wherein the connector receiving means is a duplex receiving means with a single lever receiving portion which allows a duplex connector lever to cause switching.

5. Device according to claim 1, wherein the means for effectuating switching incorporate a reflecting or refracting element mounted on a flexure plate which is configured to return said elements when the connector is removed from the receiving means.

6. Device according to claim 1, wherein the means for effectuating switching operate by the completion of an electrical circuit when the connector is pushed fully home.

7. Device according to claim 1, wherein the means for effectuating switching operate by magnetic means.

8. A device for extending the functionality of an optical network by the addition of an optical element, comprising an optical switching device as claimed in claim 1.

9. An optical switching device, comprising
   an optical switch with a first port and a second port which are in communication with each other in a first mode of use, said optical switch further comprising a third port; wherein said device further comprises:
   an optical connector receiving means incorporating a port corresponding to said third port and mateable with a connector's port;
   a locking mechanism for locking the connector in said receiving means; and
   means for effectuating switching which is triggered by an external source which when applied causes said locking mechanism to lock the connector in said receiving means.

10. A device according to claim 9, wherein means are provided to ensure that light is transmitted to the connector only when a connector is in position in the receiving means.

* * * * *